US011104786B2

(12) United States Patent
Abe et al.

(10) Patent No.: US 11,104,786 B2
(45) Date of Patent: Aug. 31, 2021

(54) FLUORINATED COPOLYMER COMPOSITION

(71) Applicants: AGC Inc., Tokyo (JP); AGC CHEMICALS AMERICAS, INC., Exton, PA (US)

(72) Inventors: Masatoshi Abe, Exton, PA (US); Katherine M. Sprick, Kennett Square, PA (US); Ryan T. Tucker, Newtown Square, PA (US)

(73) Assignees: AGC Inc., Tokyo (JP); AGC CHEMICALS AMERICAS, INC., Exton, PA (US)

( * ) Notice: Subject to any disclaimer, the term of this patent is extended or adjusted under 35 U.S.C. 154(b) by 0 days.

(21) Appl. No.: 16/588,011

(22) Filed: Sep. 30, 2019

(65) Prior Publication Data

US 2020/0040173 A1 Feb. 6, 2020

Related U.S. Application Data

(63) Continuation-in-part of application No. 16/169,247, filed on Oct. 24, 2018, which is a continuation of application No. PCT/JP2017/016436, filed on Apr. 25, 2017.

(30) Foreign Application Priority Data

Apr. 28, 2016 (JP) .............................. JP2016-091886
Sep. 2, 2016 (JP) .............................. JP2016-172023

(51) Int. Cl.
| | |
|---|---|
| *C08L 27/12* | (2006.01) |
| *C08L 81/06* | (2006.01) |
| *C08G 65/40* | (2006.01) |
| *B29C 48/00* | (2019.01) |
| *B29C 45/00* | (2006.01) |
| *B29L 31/30* | (2006.01) |
| *B29K 27/00* | (2006.01) |
| *B29K 27/18* | (2006.01) |
| *B29K 71/00* | (2006.01) |
| *B29L 31/04* | (2006.01) |
| *B29L 31/16* | (2006.01) |

(52) U.S. Cl.
CPC .......... *C08L 27/12* (2013.01); *B29C 45/0001* (2013.01); *B29C 48/022* (2019.02); *C08G 65/40* (2013.01); *C08L 81/06* (2013.01); *B29K 2027/16* (2013.01); *B29K 2027/18* (2013.01); *B29K 2071/00* (2013.01); *B29L 2031/045* (2013.01); *B29L 2031/16* (2013.01); *B29L 2031/3076* (2013.01); *C08G 2650/40* (2013.01)

(58) Field of Classification Search
CPC combination set(s) only.
See application file for complete search history.

(56) References Cited

U.S. PATENT DOCUMENTS

| | | | |
|---|---|---|---|
| 3,400,065 A | 9/1968 | Barth | |
| 4,395,512 A | 7/1983 | Kubota et al. | |
| 4,777,214 A | 10/1988 | Petersen | |
| 6,121,171 A | 9/2000 | Takahashi et al. | |
| 6,177,518 B1 | 1/2001 | Lahijani | |
| 6,780,481 B1 | 8/2004 | Lavallee et al. | |
| 7,144,622 B1 | 12/2006 | Stecher et al. | |
| 8,829,130 B2 | 9/2014 | Xie et al. | |
| 9,376,558 B2 | 6/2016 | Price et al. | |
| 9,382,414 B2 | 7/2016 | Mutsuda et al. | |
| 9,644,080 B2 | 5/2017 | Akashi et al. | |
| 9,725,542 B2 | 8/2017 | Aida et al. | |
| 9,902,821 B2 | 2/2018 | Khan et al. | |
| 10,246,586 B2 | 4/2019 | Akashi et al. | |
| 2003/0109646 A1 | 6/2003 | Kubo et al. | |
| 2004/0102572 A1 | 5/2004 | Kubo et al. | |
| 2013/0109810 A1* | 5/2013 | Xie ........................ | C08L 71/00 |
| | | | 525/153 |
| 2015/0259525 A1 | 9/2015 | Mutsuda et al. | |
| 2016/0046806 A1 | 2/2016 | Akashi et al. | |
| 2017/0158868 A1 | 6/2017 | Gantillon et al. | |
| 2017/0301430 A1 | 10/2017 | Iida et al. | |
| 2017/0341269 A1 | 11/2017 | Gabriels et al. | |
| 2019/0055390 A1 | 2/2019 | Sato et al. | |

FOREIGN PATENT DOCUMENTS

| | | |
|---|---|---|
| EP | 0356948 A2 | 3/1990 |
| EP | 0589063 A1 | 3/1994 |
| EP | 870795 A1 | 10/1998 |

(Continued)

OTHER PUBLICATIONS

International Search Report for Application No. PCT/JP2017/016436 dated Aug. 8, 2017, 5 pages.
English language abstract and machine-assisted English translation for JPH 10-338809 extracted from espacenet.com database on Oct. 7, 2019, 14 pages.
English language abstract for JPH 11-158340 extracted from espacenet.com database on Oct. 7, 2019, 1 page.
English language abstract and machine-assisted English translation for JP 2006-274073 extracted from espacenet.com database on Oct. 7, 2019, 10 pages.
English language abstract and machine-assisted English translation for JP 2014-189834 extracted from espacenet.com database on Oct. 7, 2019, 8 pages.
English language abstract for WO 2014/034493 extracted from espacenet.com database on Oct. 7, 2019, 1 page.
English language abstract for WO 2014/171028 extracted from espacenet.com database on Oct. 7, 2019, 1 page.

(Continued)

*Primary Examiner* — Ana L. Woodward
(74) *Attorney, Agent, or Firm* — Howard & Howard Attorneys PLLC

(57) ABSTRACT

A fluorinated copolymer composition includes a thermoplastic resin A and a fluorinated elastomer B dispersed within thermoplastic resin A. Thermoplastic resin A has a shear stress ($\tau_A$) of greater than 0.11 MPa when measured with a capillary rheometer at a shear rate of 243 sec$^{-1}$ and at 360° C. in accordance with ASTM D3835. Fluorinated elastomer B dispersed within thermoplastic resin A has an average dispersed particle size of less than 50 μm.

20 Claims, No Drawings

(56) References Cited

FOREIGN PATENT DOCUMENTS

| EP | 0829455 | B1 | 3/2004 |
| EP | 2891683 | A1 | 7/2015 |
| EP | 2987832 | A1 | 2/2016 |
| JP | H10338809 | A | 12/1998 |
| JP | H11158340 | A | 6/1999 |
| JP | 2006274073 | A | 10/2006 |
| JP | 2012005133 | A | 1/2012 |
| JP | 2014095034 | A | 5/2014 |
| JP | 2014189834 | A | 10/2014 |
| WO | 2014034493 | A1 | 3/2014 |
| WO | 2014171028 | A1 | 10/2014 |
| WO | 2015182702 | A1 | 12/2015 |
| WO | 2017188280 | A1 | 11/2017 |
| WO | 2018005817 | A1 | 1/2018 |

OTHER PUBLICATIONS

English language abstract for WO 2015/182702 extracted from espacenet.com database on Oct. 7, 2019, 1 page.

English language abstract for WO 2017/188280 extracted from espacenet.com database on Oct. 7, 2019, 2 pages.

English language abstract and machine-assisted English translation for EP 0 356 948 extracted from espacenet.com database on Jan. 29, 2020, 9 pages.

International Search Report for Application No. PCT/US2019/053835 dated Jan. 22, 2020, 4 pages.

English language abstract and machine-assisted English translation for JP 2012-005133 A extracted from espacenet.com database on Mar. 31, 2021, 14 pages.

English language abstract and machine-assisted English translation for JP 2014-095034 A extracted from espacenet.com database on Mar. 31, 2021, 30 pages.

\* cited by examiner

FLUORINATED COPOLYMER COMPOSITION

CROSS REFERENCE TO RELATED APPLICATIONS

This application claims priority to U.S. patent application Ser. No. 16/169,247 filed on Oct. 24, 2018, which is a continuation of PCT Application No. PCT/JP2017/016436, filed on Apr. 25, 2017, which is based upon and claims the benefit of priority from Japanese Patent Application No. 2016-91886 filed on Apr. 28, 2016 and Japanese Patent Application No. 2016-172023 filed on Sep. 2, 2016. The content of each of these applications is incorporated herein by reference in its entirety.

FIELD OF THE DISCLOSURE

The following disclosure relates to a fluorinated copolymer composition.

BACKGROUND OF THE DISCLOSURE

Engineering plastics such as a polyether ether ketone, a polyether sulfone, a polyether ketone ketone, etc. are excellent in heat resistance, mechanical properties, etc. and thus are widely used in various injection molded products. However, these engineering plastics have difficulties in impact resistance at ordinary temperature or low temperature, and improvement of these engineered plastics is desired.

SUMMARY OF THE DISCLOSURE AND ADVANTAGES

The present disclosure provides a fluorinated copolymer composition including a thermoplastic resin A and a fluorinated elastomer B dispersed within thermoplastic resin A. Thermoplastic resin A has a shear stress ($\tau_A$) of greater than 0.11 MPa when measured with a capillary rheometer at a shear rate of 243 sec$^{-1}$ and at 360° C. in accordance with ASTM D3835. Fluorinated elastomer B dispersed within thermoplastic resin A has an average dispersed particle size of less than 50 μm.

The present disclosure also provided a method of forming the fluorinated copolymer composition. The method includes melt-kneading thermoplastic resin A with fluorinated elastomer B such that fluorinated elastomer B is dispersed within thermoplastic resin A with an average dispersed particle size of less than 50 μm. Thermoplastic resin A has a shear stress ($\tau_A$) greater than 0.11 MPa when measured with a capillary rheometer at a shear rate of 243 sec$^{-1}$ and at 360° C. in accordance with ASTM D3835.

The combination of thermoplastic resin having the shear stress of greater than 0.11 MPa and the average dispersed particle size of fluorinated elastomer B synergistically results in the fluorinated copolymer compositing having excellent impact resistance while maintaining the desired heat resistance, mechanical properties and moldability.

DETAILED DESCRIPTION

The fluorinated copolymer composition of the present disclosure includes a thermoplastic resin A and a fluorinated elastomer B. The volume ratio (A:B) of thermoplastic resin A to fluorinated elastomer B contained in the fluorinated copolymer composition may be from 99:1 to 55:45. In certain embodiments, the volume ratio (A:B) is from 97:3 to 55:45, from 95:5 to 57:43, from 95:5 to 60:40, from 93:7 to 60:40, or from 90:10 to 65:35. In one embodiment, the volume ratio (A:B) of thermoplastic resin A to fluorinated elastomer B is from 90:10 to 65:35.

The volume ratio (A:B) is obtained by the following procedure. Each mass (g) of thermoplastic resin A and fluorinated elastomer B to be melt kneaded (to be introduced into a kneader) at the time of producing the fluorinated copolymer composition is divided by each specific gravity (g/cm3) to obtain each volume (cm3), and from the respective volumes (cm3) of thermoplastic resin A and fluorinated elastomer B, the above volume ratio (A:B) is calculated. The specific gravity is a value at 23° C. Each specific gravity of thermoplastic resin A and fluorinated elastomer B can be measured by an in-water displacement (suspension) method.

The total of the volumes of thermoplastic resin A and fluorinated elastomer B in the fluorinated copolymer composition is typically at least 50%. In certain embodiments, the total of the volume of thermoplastic resin A and fluorinated elastomer B in the fluorinated copolymer composition is from 60 to 99% or from 70 to 97%, of the volume of the fluorinated copolymer composition. Optional components, which collectively form the total volume of the fluorinated copolymer composition in combination with thermoplastic resin A and fluorinated elastomer B, are described below.

When the total of the volumes of thermoplastic resin A and fluorinated elastomer B in the fluorinated copolymer composition is at least 50%, excellent mechanical properties such as flexibility and mechanical strength are realized. When the total of the volume of thermoplastic resin A and fluorinated elastomer B in the fluorinated copolymer composition is at or near the above upper range (e.g. 99%), excellent heat resistance and excellent mechanical properties such as flexibility and mechanical strength are realized.

The fluorinated copolymer composition includes fluorinated elastomer B dispersed within thermoplastic resin A. The average particle size of the dispersed fluorinated elastomer B (also referred to as the average dispersed particle size) within thermoplastic resin A is less than 50 μm. In certain embodiments, the average dispersed particle size of fluorinated elastomer B is less than 40, less than 30, less than 20 or less than 10, μm. Alternatively, the average dispersed particle size is from 0.1 to 50 μm. In certain embodiments, the average dispersed particle size is from 0.1 to 40, 0.1 to 30, 0.1 to 20, 0.1 to 15, 0.1 to 10, 0.1 to 7, 0.1 to 6, or 0.1 to 3, μm. In one embodiment, the average dispersed particle size of fluorinated elastomer B is from 0.1 to 15 μm. In another embodiment, the average dispersed particle size of fluorinated elastomer B is from 0.1 to 7 μm. In another embodiment, the average dispersed particle size of fluorinated elastomer B is from 0.1 to 6 μm. In another embodiment, the average dispersed particle size of fluorinated elastomer B is from 0.1 to 3 μm.

Further, since average dispersed particle size is from 0.1 to 50 μm, it is generally not necessary to shear fluorinated elastomer B more than necessary in the melt kneading step as described later. In other words, the average dispersed particle size of 0.1 to 50 μm preserves the molecular structure while fluorinated elastomer B is dispersed in thermoplastic resin A. Thus, by dispersing in thermoplastic resin A while securing the flexibility of fluorinated elastomer B, it is possible to impart impact resistance which was insufficient only with thermoplastic resin A, to the fluorinated copolymer composition, and thus to produce the fluorinated copolymer composition having improved impact resistance.

The average dispersed particle size of fluorinated elastomer B is calculated by randomly selecting 100 particles and measuring each diameter by Scanning Electron Microscopy (SEM) observation. The average diameter of the 100 randomly selected particles is the calculated average dispersed particle size of fluorinated elastomer B.

Without being bound to any particular theory, although not required, it is believed that a consistent dispersion of fluorinated elastomer B within thermoplastic resin A is obtained by selecting thermoplastic resin A and fluorinated elastomer B such that a ratio of the viscosity of thermoplastic resin A to fluorinated elastomer B is greater than 0.35 when the viscosity is measured with a capillary rheometer at a shear rate of 12.1 sec$^{-1}$ and at 360° C. in accordance with ASTM D3835. In other words, when the combination of the particular thermoplastic resin A and fluorinated elastomer B has a viscosity ratio of greater than 0.35, a consistent dispersion of fluorinated elastomer B, having an average dispersed particle size of less than 50 μm, within thermoplastic resin A is achieved. Persons of ordinary skill in the art appreciate that a consistent dispersion is beneficial to mechanical properties, such as impact resistance.

In certain embodiments, the viscosity ratio of thermoplastic resin A to fluorinated elastomer B is greater than 0.5, 0.7, 0.9, 1.1, 1.2, 1.3, 1.5, or 1.7. In other embodiments, the viscosity ratio of thermoplastic resin A to fluorinated elastomer B is from 0.35 to 1.7, from 0.5 to 1.5, from 0.7 to 1.3, from 0.9 to 1.3 or from 1.1 to 1.3. In certain embodiments, the viscosity ratio of thermoplastic resin A to fluorinated elastomer B is from 0.35 to 1.7, and the average dispersed particle size of fluorinated elastomer B is from 0.1 to 50 μm. In other embodiments, the viscosity ratio of thermoplastic resin A to fluorinated elastomer B if from 1.1 to 1.3 and the average dispersed particle size of fluorinated elastomer B is from 0.1 to 15 μm or 0.1 to 7 μm.

Although not required, the flexural modulus of the fluorinated copolymer composition is typically from 1,000 to 3,700 MPa. Alternatively, the flexural modulus of the fluorinated copolymer composition may be from 1,300 to 3,500 MPa, from 1,500 to 3,400 MPa, or from 1,700 to 3,300 MPa. When the fluorinated copolymer composition has a flexural modulus of from 1,000 to 3,700 MPa, fluorinated elastomer B in the fluorinated copolymer composition is not cross-linked or substantially not cross-linked, despite the fact that fluorinated elastomer B may be capable of being cross-linked. Thus, in embodiments where the flexural modulus of the fluorinated copolymer composition is typically from 1,000 to 3,700 MPa, the fluorinated copolymer composition is commonly formed in the absence of a cross-linker or cross-linking co-agent. The flexural modulus of the fluorinated copolymer composition is measured in accordance with ASTM D790.

In addition to the excellent flexural modulus of the fluorinated copolymer composition, the fluorinated copolymer composition may also have excellent tensile elongation. In particular, the tensile elongation of the fluorinated copolymer composition may be greater than 120% when measured in accordance with ASTM D638-14 at 200° C. In certain embodiments, the tensile elongation may be greater than 140%, 160%, 180%, or even 200%. The excellent tensile elongation of the fluorinated copolymer composition results in the fluorinated copolymer composition being suitable for use in a wide variety of applications (e.g. from aerospace to consumer electronic applications, and automotive to household good applications), which are described further below.

In certain embodiments, the fluorinated copolymer composition satisfies the following formula.

$$CR_{1/2\text{-}B}/CR_{1/2\text{-}A}<0.9,$$

with $CR_{1/2\text{-}B}$ being the time (min) to reach the maximum of the exothermic peak derived from the crystallization of the fluorinated elastomer B under isothermal control at 315° C. in a nitrogen atmosphere. And, $CR_{1/2\text{-}A}$ being the time (minutes) to reach the maximum of the exothermic peak derived from the crystallization of thermoplastic resin A under isothermal control at 315° C. in a nitrogen atmosphere.

(Thermoplastic Resin A)

Thermoplastic resin A is at least one type of melt-moldable thermoplastic heat resistant resin selected from the following group A. Group A: a polyarylate, a polyether sulfone, a polyaryl sulfone, an aromatic polyamide, an aromatic polyether amide, an aromatic polyether imide, a polyphenylene sulfide, a polyaryl ether ketone, a polyamideimide and a liquid crystal polyester.

As thermoplastic resin A, one type, or two or more types may be used. In other words, thermoplastic resin A may include one or two or three or four, etc., thermoplastic resins with each included thermoplastic resin being collectively referred to as thermoplastic resin A. Typically, thermoplastic resin A includes only one type of thermoplastic resin.

Thermoplastic resin A is typically at least one type of thermoplastic heat resistant resin selected from the group consisting of a polyaryl ether ketone (PAEK), a polyether sulfone (PES), an aromatic polyether amide and a polyaryl sulfone. As the polyaryl ether ketone, a polyether ketone (PEK), a polyether ether ketone (PEEK), or a polyether ketone ketone (PEKK) is preferred. In certain embodiments, thermoplastic resin A is a PAEK. In other embodiments, thermoplastic resin A is PEEK. In other embodiments, thermoplastic resin A is PES. In one embodiment, thermoplastic resin A is a combination of PEEK, PAEK, and PES.

The melting point of thermoplastic resin A is typically from 200 to 430° C. Alternatively, the melting point of thermoplastic resin A is from 250 to 400° C. or from 280 to 380° C.

When the melting point is at least above 200° C., it is typically possible to maintain excellent heat resistance shown by the fluorinated copolymer composition. When the melting point is at most 430° C., it is typically possible to suppress deterioration of the physical properties due to thermal decomposition of fluorinated elastomer B at the time of melt kneading. It is also possible to maintain the characteristics of the fluorinated elastomer such as the flexibility, impact resistance, chemical resistance, etc.

The melt flow rate (MFR) of thermoplastic resin A is typically from 0.1 to 300 g/10 min. Alternatively, the MFR may be from 1 to 100 g/10 min or from 3 to 70 g/10 min.

When the MFR is at least 0.1 g/10 min, a melt-moldable composition having no roughening in appearance is typically obtainable. When the melt flow rate (MFR) is at most 300 g/10 min, dispersibility in the composition of thermoplastic resin A and fluorinated elastomer B will be good, and as a result, typically the mechanical properties and heat resistance are excellent.

The MFR is measured in accordance with ASTM D3307, where the mass (g) of the resin flowing out in 10 minutes from a nozzle of a diameter of 2 mm and a length of 8 mm under a load of 49N (5 kg) at 372° C. is measured, and the obtained value is adopted as MFR (g/10 minutes).

As thermoplastic resin A, a commercially available thermoplastic heat resistant resin may be used, or it may be produced from various raw materials by using known methods.

Although thermoplastic resin A may include a wide variety of polymers, certain polymers are not suitable for use as thermoplastic resin A. In particular, thermoplastic resin A of the present disclosure requires thermoplastic resin A to have a shear stress ($\tau_A$) of greater than 0.11 MPa when measured with a capillary rheometer at a shear rate of 243 sec$^{-1}$ and at 360° C. in accordance with ASTM D3835. Without being bound to any particular theory, it is believed that thermoplastic resin A with a shear stress of greater than 0.11 MPa significantly improves the impact resistance of the fluorinated copolymer composition, particularly when fluorinated elastomer B is dispersed within thermoplastic resin A at an average dispersed particle size of less than 50 μm. In other words, as described above, PAEK and/or PEEK is a suitable and typical thermoplastic resin A; however, not all forms or grades of PAEK and PEEK are suitable. For example, PAEK grades having a shear stress of greater than 0.11 MPa (as measured per the procedure above) are not suitable, because it would result in a conventional fluorinated copolymer composition having inferior impact resistance. It is believed that the shear stress is a critical property of thermoplastic resin A, which directly correlates with the impact resistance of the fluorinated copolymer composition when the average dispersed particle size of fluorinated elastomer B being less than 50 μm.

In certain embodiments, thermoplastic resin A has a shear stress of 0.11 MPa to 0.4 MPa. Alternatively, thermoplastic resin A may have a shear stress of 0.11 to 0.4, from 0.13 to 0.4, from 0.15 to 0.35, from 0.2 to 0.35, from 0.2 to 0.3, from 0.23 to 0.3, from 0.26 to 0.3, or about 0.27, MPa.

In certain embodiments, thermoplastic resin A may have a shear stress of 0.11 to 0.4 MPa or 0.2 to 0.3 MPa, and the average dispersed particle size of fluorinated elastomer B is from 0.1 to 15 μm or 0.1 to 7 μm. In these embodiments, thermoplastic resin A may be PEEK or PAEK. Additionally, in these embodiments, the viscosity ratio of thermoplastic resin A to fluorinated elastomer B may be from 0.35 to 1.7. The fluorinated copolymer composition of each of these embodiments exhibits excellent impact resistance. In these embodiments, the ratio of the shear stress of thermoplastic resin A to the shear stress of fluorinated elastomer B may be greater than 0.7. Alternatively, the ratio of the shear stress of thermoplastic resin A to the shear stress of fluorinated elastomer B may be from 1.4 to 2.3.

(Fluorinated Elastomer B)

Fluorinated elastomer B is a fluorinated elastic copolymer comprising units derived from at least one type of monomer (hereinafter referred to also as "the monomer (MB1)") selected from the group consisting of tetrafluoroethylene (TFE), hexafluoropropylene (HFP), vinylidene fluoride (VdF) and chlorotrifluoroethylene (CTFE). The term "units derived from a monomer" means units which are formed by the polymerization of the monomer. Units derived from a monomer may be units formed directly by the polymerization reaction of the monomer or may be units having conversion to another structure by treating the polymer or unit.

As fluorinated elastomer B, one type of fluorinated elastomer may be used, or two or more types may be used. In other words, fluorinated elastomer B may include one or two or three or four, fluorinated elastomers with each included fluorinated elastomer being collectively referred to as fluorinated elastomer B. Typically, fluorinated elastomer B includes only one type of fluorinated elastomer.

Fluorinated elastomer B may be a fluorinated elastic copolymer composed solely of two or three types of units selected from the group consisting of units based on TFE (hereinafter referred to also as "TFE units"; the same applies to the other units), HFP units, VdF units and CTFE units, or it may be a fluorinated elastic copolymer composed of at least one type of units based on the monomer (MB1) and the following monomer (MB2) copolymerizable with the monomer (MB1).

The monomer (MB2) is at least one type of monomer selected from the group consisting of ethylene (E), propylene (P), a perfluoro(alkyl vinyl ether) (PAVE), vinyl fluoride (VF), 1,2-difluoroethylene (DiFE), 1,1,2-trifluoroethylene (TrFE), 3,3,3-trifluoro-1-propylene (TFP), 1,3,3,3-tetrafluoropropylene and 2,3,3,3-tetrafluoropropylene.

Here, PAVE is a compound represented by the following formula (I), and specifically, perfluoro(methyl vinyl ether) (PMVE), perfluoro(ethyl vinyl ether) (PEVE), perfluoro(propyl vinyl ether) (PPVE) or perfluoro(butyl vinyl ether) (PBVE) may be used.

$$CF_2=CF(OR^F) \tag{I}$$

wherein $R^F$ is a C1-8 linear or branched perfluoroalkyl group.

Fluorinated elastomer B may have at least one type of unit derived from another monomer (hereinafter referred to also as "the monomer (MB3)") other than the monomer (MB1) and the monomer (MB2), which is copolymerizable with the monomer (MB1), whereby the copolymer becomes to be an elastic copolymer.

In all units constituting fluorinated elastomer B, the units derived from the monomer (MB3) are typically included in amount not to exceed 20 mol %. Alternatively, the amount of units included in fluorinated elastomer B derived from the monomer (MB3) is at most 5 mol %. Of course, fluorinated elastomer B may be free of (i.e., does not include) any units derived from the monomer (MB3). In one embodiment, fluorinated elastomer B includes only units derived from monomers (MB1) and (MB2) and therefore does not include units derived from the monomer (MB3).

Typically 100 mol % of all units constituting fluorinated elastomer B are either composed of two or three types of units derived from the monomer (MB1), or composed of at least one type of unit derived from the monomer (MB1) and at least one type of units derived from the monomer (MB2). However, it is allowable to contain units other than the monomers (MB1) and (MB2) as impurities, etc.

Fluorinated elastomer B may be a TFE/P containing copolymer (meaning a copolymer comprising TFE units and P units; here, the proportion of the total of the respective units connected by "/", i.e. in the case of a TFE/P-containing copolymer, the total of TFE units and P units, occupying in the total of all units, is typically at least 50 mol %; the same applies to other "containing copolymers"), a HFP/VdF-containing copolymer, or a TFE/PAVE-containing copolymer.

Typically, the TFE/PAVE copolymer does not include a copolymer which, even if it has TFE units and PAVE units, further contains P units or VdF units. Further, typically the HFP/VdF-containing copolymer does not include a copolymer which, even if it has HFP units and VdF units, further contains P units.

The TFE/P containing copolymer may be TFE/P (meaning a copolymer comprising TFE units and P units; the same applies to other), TFE/P/VF, TFE/P/VdF, TFE/P/E, TFE/P/

TFP, TFE/P/PAVE, TFE/P/1,3,3,3-tetrafluoropropene, TFE/P/2,3,3,3-tetrafluoropropene, TFE/P/TrFE, TFE/P/DiFE, TFE/P/VdF/TFP or TFE/P/VdF/PAVE. In one embodiment, the TFE/P containing copolymer is TFE/P (i.e., does not include any units other than TFE and P).

The HFP/VdF-containing copolymer may be HFP/VdF, TFE/VdF/HFP, TFE/VdF/HFP/TFP, TFE/VdF/HFP/PAVE, VdF/HFP/TFP or VdF/HFP/PAVE. In one embodiment, the HFP/VdF-containing copolymer is HFP/VdF.

The TFE/PAVE-containing copolymer may be TFE/PAVE, TFE/PMVE or TFE/PMVE/PPVE. In one embodiment, the TFE/PAVE-containing copolymer is TFE/PAVE.

As fluorinated elastomer B, in addition to the above-described TFE/P-containing copolymer, HFP/VdF-containing copolymer, and TFE/PAVE-containing copolymer, TFENdF/2,3,3,3-tetrafluoropropene, VdF/PAVE, VdF/2,3,3,3-tetrafluoropropene, or E/HFP may be used.

Among the above-described, fluorinated elastomer B typically includes at least one TFE/P-containing copolymer, the HFP/VdF-containing copolymer or the TFE/PAVE-containing copolymer. In one embodiment, fluorinated elastomer B is selected as TFE/P due to its excellent thermal stability during melt-kneading, the stable transporting properties at the time of melt kneading, and its ability to avoid discoloration and foaming during molding.

The compositions of these elastomers are preferably within the following ranges, from the viewpoint of easily contributing to the flexibility of the fluorinated copolymer composition.

TFE/P (meaning the molar ratio of TFE units to P units; the following ratios are likewise molar ratios) is typical 30-80:70-20. Alternatively, the ratio of TFE units to P units may be from 40-70:60-30 or from 60-50:40-50. In TFE/P/VF, the TFE:P:VF ratio is typically 30-60:60-20:0.05-40 or from 30-60:60-20:0.05-40. In TFE/P/E, the ratio of TFE:P:E is typically 20-60:70-30:0.05-40. In TFE/P/TFP, the TFE:P:TFP ratio is typically 30-60:60-30:0.05-20. In TFE/P/PAVE, the TFE:P:PAVE ratio is typically 40-70:60-29.95:0.05-20. In TFE/P/1,3,3,3-tetrafluoropropene, the TFE:P:1,3,3,3-tetrafluoropropene ratio is typically 30-60:60-20:0.05-40. In TFE/P/2,3,3,3-tetrafluoropropene, the TFE:P:2,3,3,3-tetrafluoropropene ratio is typically 30-60:60-20:0.05-40. In TFE/P/TrFE, the TFE:P:TrFE ratio is typically 30-60:60-20:0.05-40. In TFE/P/DiFE, the TFE:P:DiFE ratio is typically 30-60:60-20:0.05-40. In TFE/P/VdF/TFP, the TFE:P:VdF:TFP ratio is typically 30-60:60-20:0.05-40:0.05-20. In TFE/P/VdF/PAVE, the TFE:P:VdF:PAVE ratio is typically 30-70:60-20:0.05-40:0.05-20. In HFP/VdF, the HFP:VdF ratio is typically 99-5:1-95. In TFE/VdF/HFP, the TFE:VdF:HFP ratio is typically 20-40:1-40:20-40. In TFE/VdF/HFP/TFP, the TFE:VdF:HFP:TFP ratio is typically 30-60:0.05-40:60-20:0.05-20. In TFE/VdF/HFP/PAVE, the TFE:VdF:HFP:PAVE ratio is typically 30-70:60-20:0.05-40:0.05-20. In VdF/HFP/TFP, the VdF:HFP:TFP ratio is typically 1-90:95-5:0.05-20. In VdF/HFP/PAVE, the VdF:HFP:PAVE ratio is typically 20-90:9.95-70:0.05-20. In TFE/PAVE, the TFE:PAVE ratio is typically 40-70:60-30. In TFE/PMVE, the TFE:PMVE ratio is typically 40-70:60-30. In TFE/PMVE/PPVE, the TFE:PMVE:PPVE ratio is typically 40-70:3-57:3-57. In TFE/VdF/2,3,3,3-tetrafluoropropene, the TFE:VdF:2,3,3,3-tetrafluoropropene ratio is typically 1-30:30-90:5-60. In VdF/PAVE, the VdF:PAVE ratio is typically 3-95:97-5. In VdF/2,3,3,3-tetrafluoropropene, the VdF:2,3,3,3-tetrafluoropropene ratio is typically 30-95:70-5. In E/HFP, the E:HFP ratio is typically 40-60:60-40.

The fluorine content in fluorinated elastomer B is typically from 50 to 74 mass %, or from 55 to 70, from 57 to 60, mass %. When fluorinated elastomer B is TFE/P, the fluorine content is typically from 66 to 71 mass %. When fluorinated elastomer B is HFP/VdF, the fluorine content is typically from 66 to 70 mass %.

When the fluorine content of fluorinated elastomer B is at least the above 50 mass %, excellent heat resistance and chemical resistance will be obtained. When the content is at most 74 mass %, the flexibility of the fluorinated copolymer composition will be increased.

The fluorine content represents the proportion of the mass of fluorine atoms to the total mass of all atoms constituting fluorinated elastomer B. The analysis of the fluorine content is carried out by obtaining the molar ratios of the respective units in the fluorinated copolymer, from melt NMR measurements and total fluorine content measurement.

The number average molecular weight of fluorinated elastomer B is typically from 10,000 to 1,500,000, from 20,000 to 1,000,000, from 20,000 to 800,000 or from 50,000 to 600,000. When the number average molecular weight is at least the above lower limit value, the mechanical strength of the molded body will be good. When the number average molecular weight is at most the above upper limit value, fluorinated elastomer B will have a high fluidity so that its dispersion in thermoplastic resin A will be good, and the flexibility of the fluorinated copolymer composition will be increased.

The Mooney viscosity (ML1+10, 121° C.) of fluorinated elastomer B is typically from 20 to 200, 30 to 150 or from 40 to 120.

The Mooney viscosity is an index for the molecular weight and may be measured in accordance with JIS K6300-1: 2000. The larger this value, the larger the molecular weight, and the smaller this value, the smaller the molecular weight. When the Mooney viscosity is within the range of from 20 to 200, the fluorinated copolymer composition will be excellent in mechanical properties and moldability.

As an alternative viscosity measurement, fluorinated elastomer B may also have a viscosity greater than 2,000 Pa s. when measured with a capillary rheometer at a shear rate of 12.1 sec$^{-1}$ and at 360° C. in accordance with ASTM D3835.

The number average particle diameter of fluorinated elastomer B before melt-kneading is typically at most 10 mm. Particles with this diameter may also be referred to as "crumb." Alternatively, the number average particle diameter of fluorinated elastomer B before melt-kneading is most 8 mm or at most 6 mm. When it is within the above range, transportability by screws during the melt-kneading will be good. The number average particle diameter of the fluorinated elastomer (B) before melt-kneading is one obtained by randomly selecting 100 particles by an optical microscope, measuring their particle diameters and calculating an average value.

In certain embodiments, fluorinated elastomer B is TFE/P. Thermoplastic resin A may have a shear stress of 0.11 to 0.4 MPa or 0.2 to 0.3 MPa, and the average dispersed particle size of fluorinated elastomer B is from 0.1 to 15 μm or 0.1 to 7 μm. In these embodiments, thermoplastic resin A may be PAEK or PEEK. Additionally, in these embodiments, the viscosity ratio of thermoplastic resin A to fluorinated elastomer B may be from 0.35 to 1.7. The fluorinated copolymer composition of each of these embodiments exhibits excellent impact resistance.

In certain embodiments, the ratio of the shear stress of thermoplastic resin A to the shear stress of fluorinated elastomer B may be greater than 0.7. Alternatively, the ratio of the shear stress of thermoplastic resin A to the shear stress of fluorinated elastomer B may be greater than 0.8, 1.0, 1.2, or 1.4. Alternatively, the ratio may be from 0.7 to 2.3, 0.9 to 2.3, 1.1 to 2.3, 1.4 to 2.3 or 1.6 to 2.0.

(Preparation of Fluorinated Elastomer B)

Fluorinated elastomer B can be produced by copolymerizing at least one type of the monomer (MB1) and, as the case requires, one or both of the monomer (MB2) and the monomer (MB3).

The polymerization method may be an emulsion polymerization method, a solution polymerization method, a suspension polymerization method, a bulk polymerization method, etc. An emulsion polymerization method of polymerizing monomers in the presence of an aqueous medium and an emulsifier, is typically utilized, since it is thereby easy to adjust the number-average molecular weight of the fluorinated copolymer or the copolymer composition, and the productivity will be excellent.

In the emulsion polymerization method, a latex of an elastomer is obtainable via a step (emulsion polymerization step) of polymerizing (emulsion polymerizing) a monomer component comprising the above-described monomers in the presence of an aqueous medium, an emulsifier and a radical polymerization initiator. In the emulsion polymerization step, a pH adjusting agent may be added.

(Other Components)

The fluorinated copolymer composition may optionally include, in addition to thermoplastic resin A and fluorinated elastomer B, other components.

Other components may be additives such as a filler, a plasticizer, a flame retardant, etc.

One of these additives may be used alone, or two or more of them may be used in combination.

In a case where other components are included in the fluorinated copolymer composition, the total of the volumes of such other components is typically at most 50% of the volume of the fluorinated copolymer composition. Alternatively, the total volumes of the other components may be from 1 to 40 vol % or from 3 to 30 vol %.

Fillers as other components may be inorganic fillers, etc.

The inorganic fillers may be $CaCO_3$, $SiO_2$, $TiO_2$, $BaSO_4$, ZnO, $Al(OH)_3$, $Mg(OH)_2$, talc, mica, carbon black, white carbon, clay, carbon nanotubes, glass fibers, carbon fibers, etc.

Carbon black may be used without limitation so long as it is one to be used as a filler for a fluorocarbon rubber. Specific examples thereof include furnace black, acetylene black, thermal black, channel black, graphite, etc. When the other components include carbon black, typically the carbon black is furnace black. The furnace black includes HAF-LS carbon, HAF carbon, HAF-HS carbon, FEF carbon, GPF carbon, APF carbon, SRF-LM carbon, SRF-HM carbon, MT carbon, etc., and among them, MT carbon is typically utilized.

In a case where the fluorinated copolymer composition contains carbon black, the content of carbon black is typically from 1 to 50 parts by mass or 3 to 20 parts by mass, based on 100 parts by mass of fluorinated elastomer B. When the content of carbon black is at least 1 part by mass, although not required, a crosslinked product obtained by cross-linking of the fluorinated copolymer composition will be excellent in strength due to the reinforcing effect by incorporation of carbon black. Further, when the content of carbon black is at most 50 parts by mass, the elongation of the cross-linked product will also be excellent. Thus, when the content of carbon black is 1 to 50 parts by mass, the balance between the strength and the elongation of the crosslinked product will be good.

In a case where the fluorinated copolymer composition contains a filler other than carbon black, the content thereof is typically from 5 to 200 parts by mass, or from 10 to 100 parts by mass, based on 100 parts by mass of fluorinated elastomer B.

As the filler, at least one type may be used singly, and carbon black and another filler may be used in combination. In a case where the molded product contains carbon black and another filler, the content thereof is typically from 1 to 100 parts by mass, or from 3 to 50 parts by mass, based on 100 parts by mass of fluorinated elastomer B.

Plasticizers and flame retardants as other components are not particularly limited, and known plasticizers and flame retardants may be employed. As the plasticizers, phthalic acid esters, adipic acid esters, etc. may be used. As the flame retardants, aluminum hydroxide, magnesium hydroxide, magnesium carbonate, antimony trioxide, sodium antimonate, antimony pentoxide, phosphazene compounds, phosphoric acid esters, ammonium polyphosphate, melamine polyphosphate, melam melem, red phosphorus, molybdenum compounds, borate compounds, PTFE, etc. may be used, and antimony trioxide; phosphoric acid esters such as triphenyl phosphate, tricresyl phosphate, trixylenyl phosphate, cresyl phenyl phosphate, 2-ethylhexyl diphenyl phosphate and other aromatic phosphoric acid esters; and PTFE being an anti-dripping agent which forms a fibril structure in the resin; are preferred.

[Method for Producing Fluorinated Copolymer Composition]

The present disclosure also provides a method for producing the fluorinated copolymer composition. The method includes a step of melt-kneading thermoplastic resin A and fluorinated elastomer B (hereinafter referred to as a "melt-kneading step").

In the case of incorporating other components in the fluorinated copolymer composition, the other components may be added in the step of melt-kneading thermoplastic resin A and fluorinated elastomer B, or may be added after melt-kneading thermoplastic resin A and fluorinated elastomer B.

In the melt-kneading step, melt-kneading is conducted by adjusting the volume ratio (A:B) of thermoplastic resin A to fluorinated elastomer B to be from 99:1 to 55:45. This volume ratio (A:B) may alternatively be from 95:5 to 57:43, from 95:5 to 60:40, from 93:7 to 60:40, or from 90:10 to 65:35.

When the volume ratio (A:B) is within 99:1 to 55:45, typically there will be no visual roughness apparent on the strand obtainable at the time of melt kneading, and as a result, pellets obtainable from melt kneading will be excellent in melt moldability.

Further, when thermoplastic resin A is contained within the above volume range, excellent heat resistance and mechanical properties can be obtained. When fluorinated elastomer B is contained within the above volume range, excellent flexibility is obtainable, it is also possible to prevent roughness on the surface of the molded product.

As the apparatus to be used in the melt-kneading step, it is possible to use a known apparatus having a melt-kneading function. For example, a single screw extruder or twin-screw extruder provided with a screw with a high kneading effect may be used. As one example, a Laboplastmill mixer (manufactured by Toyo Seiki Seisakusho, Ltd.) may be used.

As for the method of supplying thermoplastic resin A and fluorinated elastomer B to the apparatus having a melt-kneading function, thermoplastic resin A and fluorinated elastomer B may be premixed, and the obtained mixture may be supplied to the apparatus having a melt kneading function, or thermoplastic resin A and fluorinated elastomer B may be separately supplied to the apparatus having a melt kneading function.

Further, in the case of incorporating other components as optional components in the fluorinated copolymer composition, such other components may be premixed with one of thermoplastic resin A and fluorinated elastomer B, and the mixture may be supplied to the apparatus having a melt kneading function. Or, such other components may be supplied to the apparatus separately from thermoplastic resin A and fluorinated elastomer B. Further, as described above, such other components may be added after thermoplastic resin A and fluorinated elastomer B are melt-kneaded.

The kneading temperature in the melt-kneading step may be selected based on the particular type of thermoplastic resin A and fluorinated elastomer B. Typically, kneading temperature is from 220 to 480° C., from 280 to 450° C., from 290 to 420° C., or from 300 to 400° C.

The extrusion shear rate in the melt-kneading step is selected based on the melt viscosity of the components to be melt-kneaded at the kneading temperature in the above melt-kneading step. Typically, the extrusion shear rate in the melt-kneading step is from 3 to 2,500 $s^{-1}$, from 10 to 2,000 $s^{-1}$, or from 15 to 1,500 $s^{-1}$.

In the melt kneading step, the residence time in the apparatus having a melt kneading function of the object to be melt-kneaded, is typically from 10 to 290 seconds, from 20 to 240 seconds, or from 30 to 210 seconds.

In the method for producing a fluorinated copolymer composition, the melt-kneading step is conducted so that fluorinated elastomer B becomes dispersed in thermoplastic resin A as particles with a dispersed average particle diameter of from 0.1 to 50 μm.

It is possible to disperse fluorinated elastomer B in thermoplastic resin A and achieve a dispersed average particle diameter of from 0.1 to 50 μm by suitably adjusting the kneading temperature, the extrusion shear rate, and the residence time in the apparatus in the melt-kneading step.

Further, the melt-kneading step is typically conducted substantially in the absence of a crosslinking agent or crosslinking aid. "Conducted substantially in the absence of a crosslinking agent or crosslinking aid", means that the melt-kneading is conducted without letting fluorinated elastomer B in the fluorinated copolymer composition be substantially crosslinked. Whether or not fluorinated elastomer B in the fluorinated copolymer composition is substantially crosslinked, can be confirmed by the value of the flexural modulus of the fluorinated copolymer composition. If fluorinated elastomer B is substantially crosslinked, the flexibility of the fluorinated elastic copolymer is lost, whereby the flexural modulus of the fluorinated copolymer composition exceeds 3,700 MPa.

By conducting the melt-kneading step substantially in the absence of a crosslinking agent and crosslinking aid, it is possible to secure the flexibility of fluorinated elastomer B in the fluorinated copolymer composition, and to improve the impact resistance of the fluorinated copolymer composition.

As described above, by melt-kneading thermoplastic resin A and fluorinated elastomer B, and other components if included, a fluorinated copolymer composition including thermoplastic resin A and fluorinated elastomer B is obtainable, and the obtained fluorinated copolymer composition is melt-moldable and can be made into a molded product by melt molding.

The fluorinated copolymer composition of the present disclosure can be made into a powder form to be used as a coating material. Applications as coated articles may be those described in WO2015/182702, which is hereby incorporated by reference in its entirety.

The fluorinated copolymer composition of the present disclosure is also useful as an additive to a fiber-reinforced molded product, or as a matrix resin of a prepreg of the present disclosure.

[Molded Product]

The molded product of the present disclosure is a molded product obtained by molding a molding material comprising the fluorinated copolymer composition.

Polymer fillers may be used as components to be contained in the molding material, other than the fluorinated copolymer composition of the present disclosure.

As such polymer fillers, polycarbonate, polyethylene terephthalate, polybutylene terephthalate, polyarylate, polycaprolactone, phenoxy resins, polysulfone, polyether sulfone, polyether ketone, polyether ether ketone, polyether imide, polyamide 6, polyamide 66, polyamide 11, polyamide 12, polyamide 610, polyphenylene oxide, polyphenylene sulfide, polytetrafluoroethylene, acrylonitrile/butadiene/styrene copolymer (ABS), polymethyl methacrylate (PMMA), polypropylene, polyethylene, polybutadiene, butadiene-styrene copolymer, ethylene-propylene-diene rubber (EPDM), styrene-butadiene block copolymer, butadiene-acrylonitrile copolymer, acrylic rubber, styrene-maleic anhydride copolymer, styrene-phenyl maleimide copolymer, etc. may be used.

The method for molding the molding material including the fluorinated copolymer composition of the present disclosure is not particularly limited so long as it is a usual molding method, and it may, for example, be injection molding, extrusion molding, coextrusion molding, blow molding, compression molding, inflation molding, transfer molding, calendar molding, etc. The fluorinated copolymer composition is typically excellent in melt-moldability, and therefore, the molded product is typically an injection molded product formed by injection molding.

The melt molding apparatus to be used for melt molding of the fluorinated copolymer composition, may be one commonly used in melt molding, for example, hot pressing duplex "Model: SA-301" (melt heat press machine, manufactured by Tester Sangyo Co., Ltd.) may be used.

The production of a molded product may be carried out continuously subsequent to the above-described production of the fluorinated copolymer composition.

The molded product may be used in various applications. Specific examples may be, although not particularly limited, a sliding member, a sealing material, a gear, an actuator, a piston, a bearing, a housing, an aircraft interior material, a fuel tube, a bushing, a tube, a hose, a tank, a seal, a wire, a cable, a film, a sheet, a bottle, a fiber, etc.

As the tube, hose, tank, seal or wire, those described in WO2015/182702 may be used. Further, the tube or hose may be a tube for drilling for energy resources such oil, natural gas, shale oil, etc. An electric wire covering material for wires, cables, etc. is typically used as an insulating covering of an electric wire or rectangular copper wire for motor coils, typically as an insulating covering of a rectangular conductor to be used in a drive motor for a hybrid vehicle (HEV) or an electric vehicle (EV), and in such a case, insulating covering is typically made by a film. An application to a downhole cable for drilling for energy resources such as oil, natural gas, shale oil, etc. may also be used. Further, applications include a speaker vibration plate, a plate for traumatic injury or bone fracture, an insulating paper in various electrical insulating adhesive tapes, such as an insulating paper in a motor, a sealing tape to be used in oil and natural gas pipes The shape of the molded product of the present disclosure is not particularly limited, and the molded product may be used in shapes, for applications and as riser pipes, as described in WO2015/182702.

The molded product of the present disclosure made from the fluorinated copolymer composition has improved impact resistance and is excellent in moldability without impairing excellent heat resistance and mechanical properties, which are inherent to a thermoplastic heat resistant resin. These properties result in the molded product being useful in high performance applications such as a housing or an aircraft interior.

The melt extrusion molding method for a film is not particularly limited. A flat-die method or an inflation method may be used. In a flat die method, the flow rate of the molten resin and the thickness of the product can be precisely controlled by adjusting the choke bar or the lip in the die. Further, in an inflation method, by introducing air from a circular die into an extruded product for inflation to obtain a film, it is possible to control the film thickness to be uniform.

The cylinder temperature at the time of the above molding is typically from 300 to 420° C., or from 330 to 370° C. Further, the die temperature is preferably from 350 to 420° C., more preferably from 350 to 380° C. Within the above range, the obtainable film will be excellent in surface smoothness since the friction stress with the die is reduced, and at the same time, decomposition of the resin due to the thermal history during molding will be suppressed, whereby the surface smoothness of the film will be excellent.

The extrusion shear rate during film molding is typically from 3 to 2,500 sec-1, from 10 to 1,000 sec-1, or from 10 to 100 sec-1. The residence time in the apparatus is typically from 10 to 1,000 seconds or from 60 to 500 seconds.

[Prepreg]

The prepreg of the present disclosure comprises a matrix resin and reinforcing fibers. Specifically, it is a sheet-form material having a matrix resin impregnated to reinforcing fibers, and it may be said to be a sheet-form material having reinforcing fibers embedded in the matrix resin (i.e., the fluorinated copolymer composition).

(Reinforcing Fibers)

As the reinforcing fibers, from the viewpoint of mechanical properties of the fiber-reinforced molded product, continuous long fibers with a length of at least 10 mm are typically used. The reinforcing fibers need not be continuous over the entire length in the longitudinal direction or the entire width direction in the width direction, of the reinforcing fiber sheet, and they may be divided in the middle.

As a processed form of the reinforcing fibers, from the viewpoint of mechanical properties of the fiber-reinforced molded product, one processed into a sheet-form (hereinafter referred to also as a "reinforcing fiber sheet") is typical. The reinforcing fiber sheet may be a reinforcing fiber bundle composed of a plurality of reinforcing fibers, a cloth made by weaving such reinforcing fiber bundles, a unidirectional reinforcing fiber bundle having a plurality of reinforcing fibers aligned in one direction, a unidirectional cloth composed of such unidirectional fiber bundles, a combination thereof, one having a plurality of reinforcing fiber bundles laminated, etc.

The reinforcing fibers may be inorganic fibers, metal fibers, organic fibers, etc.

The inorganic fibers may be carbon fibers, graphite fibers, glass fibers, silicon carbide fibers, silicon nitride fibers, alumina fibers, silicon carbide fibers, boron fibers, etc.

The metal fibers may be aluminum fibers, brass fibers, stainless steel fibers, etc.

The organic fibers may be aromatic polyamide fibers, polyaramide fibers, polyparaphenylene benzoxazole (PBO) fibers, polyphenylene sulfide fibers, polyester fibers, acrylic fibers, nylon fibers, polyethylene fibers, etc.

The reinforcing fibers may be ones having surface treatment applied.

As the reinforcing fibers, one type may be used alone, or two or more types may be used in combination.

In certain embodiments, the reinforcing fibers are carbon fibers, which have a relatively low specific gravity and relatively high strength and modulus.

[Fiber-Reinforced Molded Product]

The fiber-reinforced molded product of the present disclosure is one using the prepreg of the present disclosure.

The fiber-reinforced molded product may be formed by using only the prepreg of the present disclosure; may be a laminate formed by using the prepreg of the present disclosure and another prepreg other than the prepreg of the present disclosure; or may be a laminate formed by using the prepreg of the present disclosure, and, as the case requires, another prepreg and a member other than prepregs.

Another prepreg may be a prepreg wherein the matrix resin comprises thermoplastic resin A and does not contain fluorinated elastomer B; or a prepreg wherein the matrix resin comprises fluorinated elastomer B and does not contain thermoplastic resin A.

The member other than prepregs may be a metal member; a resin film containing thermoplastic resin A; a resin film containing fluorinated elastomer B, etc.

The metal member may be a metal foil, various metal parts, etc. As the metal, iron, stainless steel, aluminum, copper, brass, nickel, zinc, etc. may be used. The shape of the metal member is not particularly limited, and may suitably be selected according to the fiber-reinforced molded product to be obtained. The fiber-reinforced molded product of the present disclosure may be formed by usual hot press molding treatment by using the prepreg of the present disclosure.

The fiber-reinforced molded product of the present disclosure may be used as one disclosed in WO2015/182702, a housing for a smart phone, a core material for a power line, a pressure container for storage of hydrogen or fuel oil such as gasoline, a repair or reinforcing sheet for a tunnel or road, an aircraft member, a blade for a windmill, an outer plate for an automobile, a housing for an electronic device, a tray or chassis, a sporting good (a frame of a tennis racket, a bat, a golf club shaft, a fishing rod, a bicycle frame, a rim, a wheel, a crank, etc.), etc.

Further, the molded product may be used as laminated or composited partially with another material. As such another material, a metal (iron, copper, stainless steel, etc.), glass, plastic, rubber, etc. may be used.

Specific examples of the another material in the form of plastic may be those described in WO2015/182702, such as for example, a liquid crystal polymer, a polyaryl ketone, a polyether sulfone, a polyphenyl sulfone, a polyacetal, a polyurethane, etc. As the polyamide, polyamide 6, polyamide 66, polyamide 46, polyamide 11, polyamide 12, polyamide 610, polyamide 612, polyamide 6/66 copolymer, polyamide 6/66/610 copolymer, polyamide MXD6, polyamide 6T, polyamide 9T, and polyamide 6/6T copolymer, etc.

EXAMPLES

Samples and comparative samples were prepared using a twin screw extruder. The compositions of Samples 1-12 are provided in Table 1 and the process parameters for the twin screw extruder are provided in Table 3. The compositions of Comparative Examples A and B are provided in Table 2 and the process parameters for the twin screw extruder are provided in Table 4. It should be noted that Comparative Example B generally corresponds to Examples 1-4 described in WO 2017/188280.

TABLE 1

| Sample No. | Fluorinated Elastomer | Thermoplastic Resin | Shear Stress of Fluorinated Elastomer | Average Dispersed Particle Size of Fluorinated Elastomer |
|---|---|---|---|---|
| 1 | F-1 | PEEK-1 | 0.27 | <3 |
| 2 | F-1 | PEEK-1 | 0.27 | <3 |
| 3 | F-1 | PEEK-1 | 0.27 | <7 |
| 4 | F-1 | PEEK-1 | 0.27 | <3 |
| 5 | F-1 | PEEK-1 | 0.27 | <3 |
| 6 | F-1 | PEEK-1 | 0.27 | <3 |
| 7 | F-1 | PEEK-3 | 0.26 | <3 |
| 8 | F-1 | PEEK-3 | 0.26 | <3 |
| 9 | F-1 | PEEK-3 | 0.26 | <3 |
| 10 | F-1 | PEEK-4 | 0.25 | <3 |
| 11 | F-1 | PEEK-4 | 0.25 | <3 |
| 12 | F-1 | PEEK-4 | 0.25 | <3 |

TABLE 2

| Comparative Sample No. | Fluorinated Elastomer | Thermoplastic Resin | Shear Stress of Fluorinated Elastomer | Average Dispersed Particle Size of Fluorinated Elastomer |
|---|---|---|---|---|
| A | F-1 | PEEK-2 | 0.10 | 16 |
| B | F-1 | PEEK-2 | 0.10 | 7 |

TABLE 3

| Sample No. | Screw Rotation (rpm) | Extruder Barrel Size (mm) | Screw Shear (sec−1) | Resin Temperature °C. | Shear Viscosity of Thermoplastic at Screw Shear (Pa*sec) |
|---|---|---|---|---|---|
| 1 | 200 | 27 | 283 | 386 | 699 |
| 2 | 200 | 27 | 283 | 385 | 711 |
| 3 | 200 | 27 | 283 | 374 | 840 |
| 4 | 200 | 27 | 452 | 410 | 299 |
| 5 | 64 | 27 | 91 | 364 | 1637 |
| 6 | 200 | 27 | 283 | 386 | 699 |
| 7 | 160 | 27 | 226 | 382 | 894 |
| 8 | 160 | 27 | 226 | 381 | 894 |
| 9 | 130 | 27 | 184 | 379 | 969 |
| 10 | 200 | 27 | 283 | 380 | 852 |
| 11 | 180 | 27 | 254 | 381 | 916 |
| 12 | 180 | 27 | 254 | 380 | 916 |

TABLE 4

| Sample No. | Screw Rotation (rpm) | Extruder Barrel Size (mm) | Screw Shear (sec−1) | Resin Temperature °C. | Shear Viscosity of Thermoplastic at Screw Shear (Pa*sec) |
|---|---|---|---|---|---|
| A | 160 | 27 | 226 | 380 | 321 |
| B | 200 | 15 | 157 | 380 | 354 |

Fluorinated elastomer (F-1): is a tetrafluoroethylene-propylene copolymer (manufactured by Asahi Glass Company, Limited, product name "AFLAS 150FC".

Thermoplastic resin (PEEK 1): is a polyether ether ketone with the tradename Vestakeep 5000G.

Thermoplastic resin (PEEK 2): is a polyether ether ketone with the tradename Victrex PEEK 150P.

Thermoplastic resin (PEEK 3): is a polyether ether ketone with the tradename Ketaspire KT-820NT.

Thermoplastic resin (PEEK 4): is a polyether ether ketone with the tradename Victrex PEE450G.

Additional sample information and performance data is provided below in Tables 5-7.

TABLE 5

| Sample No. | Weight Ratio of Thermoplastic Resin to Fluorinated Elastomer | Viscosity Ratio of Thermoplastic Resin to Fluorinated Elastomer | Ratio of Shear Stress Thermoplastic Resin to Fluorinated Elastomer | Izod Impact Strength (J/m) |
|---|---|---|---|---|
| 1 | 88/12 | 1.14 | 1.7 | 263 |
| 2 | 77/23 | 1.14 | 1.7 | — |
| 3 | 66/34 | 1.14 | 1.7 | — |
| 4 | 77/23 | 1.14 | 1.7 | — |
| 5 | 77/23 | 1.14 | 1.7 | — |
| 6 | 77/23 | 1.14 | 1.7 | — |
| 7 | 90/10 | 1.07 | 1.6 | 192 |
| 8 | 88/12 | 1.07 | 1.6 | 335 |
| 9 | 66/34 | 1.07 | 1.6 | — |
| 10 | 90/10 | 1.9 | 1.6 | 136 |
| 11 | 88/12 | 1.9 | 1.6 | 163 |
| 12 | 66/34 | 1.9 | 1.6 | — |

TABLE 6

| Sample No. | Weight Ratio of Thermoplastic Resin to Fluorinated Elastomer | Viscosity Ratio of Thermoplastic Resin to Fluorinated Elastomer | Ratio of Shear Stress Thermoplastic Resin to Fluorinated Elastomer | Izod Impact Strength (J/m) |
|---|---|---|---|---|
| A | 77/23 | 0.32 | 0.6 | 39 |
| B | 88/12 | 0.32 | 0.6 | <42 |

TABLE 7

| Sample No. | IRM-903 Immersion | Diesel No.2 Immersion | Steam Immersion |
|---|---|---|---|
| 1 | 57 | 29 | 53 |
| 2 | 76 | 33 | 54 |
| 3 | 53 | 54 | 108 |

It is to be appreciated that the weight ratio, viscosity ratio, shear stress, average dispersed particle size, and ratio of shear stress are all calculated as extensively described above. The Izod impact strength was measured in accordance with ASTM D 256-10 Test Method A at 70°±5° F., 50%±10% R.H., with the following conditioning: A 40+ hrs, 70°±5° f, 50%±10% R.H, and a notched flex bar preparation, with the notch having a 45° angle with an end radius of 0.010". The molding method for the test bar utilized injection molding temperature profile (F), NOZ=707-734, Barrel 680-716, and Tooling 390. The steam immersion was conducted at 260° C. for 21 days with the use of steam. The diesel immersion was conducted at 150° C. for 21 days immersion with the use of a weight ratio of 100% of diesel fuel No. 2 specified in CAS No. 68476-34-6.

As shown above, in Tables 5 and 6, Samples 1, 7, 8, 10, and 11 each significantly outperformed Comparative Samples A and B in impact strength. Notably, the shear stress of the thermoplastic resin of Samples 1-12 was greater than 0.11 MPa. Whereas, the shear stress of the thermoplastic resin of Comparative Samples A and B was less than 0.11 MPa.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A fluorinated copolymer composition comprising:
a thermoplastic resin A having a shear stress ($\tau_A$) of greater than 0.11 MPa when measured with a capillary rheometer at a shear rate of 243 sec$^{-1}$ and at 360° C. in accordance with ASTM D3835; and
a fluorinated elastomer B dispersed within thermoplastic resin A and having an average dispersed particle size of less than 50 μm;
wherein the ratio of the viscosity of thermoplastic resin A to fluorinated elastomer B is from 1.1 to 1.3 when the viscosity is measured with a capillary rheometer at a shear rate of 12.1 sec$^{-1}$ and at 360° C. in accordance with ASTM D3835.

2. The fluorinated copolymer composition as set forth in claim 1 wherein thermoplastic resin A is at least one melt-moldable, heat-resistant thermoplastic resin selected from the group consisting of a polyarylate, a polyether sulfone, a polyaryl sulfone, an aromatic polyamide, an aromatic polyether amide, an aromatic polyether imide, a polyphenylene sulfide, a polyaryl ether ketone, a polyamideimide and a liquid crystal polyester.

3. The fluorinated copolymer composition as set forth in claim 2 wherein fluorinated elastomer B comprises units derived from at least one monomer selected from the group consisting of tetrafluoroethylene, hexafluoropropylene, vinylidene fluoride and chlorotrifluoroethylene.

4. The fluorinated copolymer composition as set forth in claim 1 having a flexural modulus of from 1,000 to 3,700 MPa.

5. The fluorinated copolymer composition as set forth in claim 1 wherein the ratio of the viscosity of thermoplastic resin A to fluorinated elastomer B is greater than 1.1 and less than 1.3 when the viscosity is measured with a capillary rheometer at a shear rate of 12.1 sec$^{-1}$ and at 360° C. in accordance with ASTM D3835, and wherein fluorinated elastomer B is a copolymer having units derived from tetrafluoroethylene and propylene.

6. The fluorinated copolymer composition as set forth in claim 5 wherein the viscosity of fluorinated elastomer B is greater than 2,000 Pa s. when measured with a capillary rheometer at a shear rate of 12.1 sec$^{-1}$ and at 360° C. in accordance with ASTM D3835.

7. The fluorinated copolymer composition as set forth in claim 1 wherein fluorinated elastomer B is selected from the group consisting of a copolymer having units derived from tetrafluoroethylene and propylene, a copolymer having units derived from hexafluoropropylene and vinylidene fluoride, and a copolymer having units derived from tetrafluoroethylene and a perfluoro(alkyl vinyl ether) with the perfluoro (alkyl vinyl ether) represented by the following formula (I),

$$CF_2=CF(OR^F) \quad (I)$$

wherein RF is a $C_{1-8}$ linear or branched perfluoroalkyl group.

8. The fluorinated copolymer composition as set forth in claim 1 wherein fluorinated elastomer B is a copolymer having units derived from tetrafluoroethylene and propylene.

9. The fluorinated copolymer composition as set forth in claim 1 wherein thermoplastic resin A is selected from the group consisting of a polyaryl ether ketone, a polyether sulfone, a polyether ether ketone, an aromatic polyether amide and a polyaryl sulfone.

10. The fluorinated copolymer composition as set forth in claim 1 wherein thermoplastic resin A is a polyaryl ether ketone or a polyether ether ketone.

11. The fluorinated copolymer composition as set forth in claim 1 wherein the ratio of the weight percent of thermoplastic resin A to the weight percent of fluorinated elastomer B is from 99/1 to 55/45.

12. The fluorinated copolymer composition as set forth in claim 1 having a tensile elongation of greater than 120% when measured in accordance with on ASTM D638-14 at 200° C.

13. The fluorinated copolymer composition as set forth in claim 1 wherein thermoplastic resin A has a shear stress ($\tau_A$) of greater than 0.2 Mpa, and a ratio of the viscosity of thermoplastic resin A to fluorinated elastomer B is greater than 1.1 and less than 1.3 when the viscosity is measured with a capillary rheometer at a shear rate of 12.1 sec$^{-1}$ and at 360° C. in accordance with ASTM D3835.

14. The fluorinated copolymer composition as set forth in claim 13 wherein fluorinated elastomer B dispersed within thermoplastic resin A has an average dispersed particle size of less than 15 μm.

15. The fluorinated copolymer composition as set forth in claim 14 wherein thermoplastic resin A is polyaryl ether ketone, polyether ether ketone or a combination thereof, and fluorinated elastomer B is a copolymer having units derived from tetrafluoroethylene and propylene.

16. An injection molded or extruded product obtained from the fluorinated copolymer composition as set forth in claim 1.

17. A fluorinated copolymer composition comprising:
a thermoplastic resin A having a shear stress ($\tau_A$) of greater than 0.11 MPa when measured with a capillary rheometer at a shear rate of 243 sec$^{-1}$ and at 360° C. in accordance with ASTM D3835; and
a fluorinated elastomer B dispersed within thermoplastic resin A and having an average dispersed particle size of less than 15 μm;
wherein the ratio of a viscosity of thermoplastic resin A to fluorinated elastomer B is greater than 1.1 and less than 1.3 when the viscosity is measured with a capillary rheometer at a shear rate of 12.1 sec$^{-1}$ and at 360° C. in accordance with ASTM D3835;
wherein thermoplastic resin A is at least one melt-moldable thermoplastic heat-resistant resin selected from the group consisting of a polyarylate, a polyether sulfone, a polyaryl sulfone, an aromatic polyamide, an aromatic polyether amide, an aromatic polyether imide, a polyphenylene sulfide, a polyaryl ether ketone, polyether ether ketone, a polyamideimide and a liquid crystal polyester; and
wherein fluorinated elastomer B is selected from the group consisting of a copolymer having units derived from tetrafluoroethylene and propylene, a copolymer having units derived from hexafluoropropylene and vinylidene fluoride, and a copolymer having units derived from tetrafluoroethylene and a perfluoro(alkyl vinyl ether) with the perfluoro(alkyl vinyl ether) represented by the following formula (I),

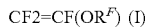

CF2=CF(OR$^F$)   (I)

with RF being a $C_{1-8}$ linear or branched perfluoroalkyl group.

18. The fluorinated copolymer composition as set forth in claim 17 wherein thermoplastic resin A is polyaryl ether ketone, polyether ether ketone or a combination thereof, and fluorinated elastomer B is a copolymer having units derived from tetrafluoroethylene and propylene.

19. A method of forming a fluorinated copolymer composition comprising:
melt-kneading (i) a thermoplastic resin A with (ii) a fluorinated elastomer B such that fluorinated elastomer B is dispersed within thermoplastic resin A with an average dispersed particle size of less than 50 μm to form the fluorinated copolymer composition;
wherein thermoplastic resin A has a shear stress ($\tau_A$) greater than 0.11 MPa when measured with a capillary rheometer at a shear rate of 243 sec$^{-1}$ and at 360° C. in accordance with ASTM D3835; and
wherein the ratio of the viscosity of thermoplastic resin A to fluorinated elastomer B is from 1.1 to 1.3 when the viscosity is measured with a capillary rheometer at a shear rate of 12.1 sec$^{-1}$ and at 360° C. in accordance with ASTM D3835.

20. The method of claim 19 wherein the ratio of the viscosity of thermoplastic resin A to fluorinated elastomer B is greater than 1.1 and less than 1.3 when the viscosity is measured with a capillary rheometer at a shear rate of 12.1 sec$^{-1}$ and at 360° C. in accordance with ASTM D3835, and wherein fluorinated elastomer B is a copolymer having units derived from tetrafluoroethylene and propylene.

* * * * *